(12) United States Patent
Walker et al.

(10) Patent No.: US 11,008,886 B2
(45) Date of Patent: May 18, 2021

(54) VARIABLE VANE STABILIZER

(71) Applicant: UNITED TECHNOLOGIES CORPORATION, Farmington, CT (US)

(72) Inventors: Herbert L. Walker, Bloomfield, CT (US); Jonathan D. Little, West Hartford, CT (US); Manjunath Subramanya, East Hartford, CT (US); Mark Boyer, Vernon, CT (US); Bernard W. Pudvah, Portland, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 16/429,976

(22) Filed: Jun. 3, 2019

(65) Prior Publication Data

US 2019/0316483 A1 Oct. 17, 2019

Related U.S. Application Data

(62) Division of application No. 15/004,709, filed on Jan. 22, 2016, now Pat. No. 10,352,186.

(51) Int. Cl.
*F01D 17/16* (2006.01)
*F01D 9/04* (2006.01)
*F04D 29/54* (2006.01)
*F04D 29/56* (2006.01)

(52) U.S. Cl.
CPC ........... *F01D 17/162* (2013.01); *F01D 9/041* (2013.01); *F04D 29/542* (2013.01); *F04D 29/563* (2013.01); *F05D 2220/32* (2013.01); *F05D 2230/60* (2013.01); *F05D 2240/12* (2013.01); *F05D 2260/30* (2013.01); *F05D 2260/36* (2013.01); *F05D 2260/50* (2013.01); *Y02T 50/60* (2013.01)

(58) Field of Classification Search
CPC ............................ F01D 17/162; F04D 29/563
See application file for complete search history.

(56) References Cited

U.S. PATENT DOCUMENTS

| | | | |
|---|---|---|---|
| 3,954,349 A | 5/1976 | Abild | |
| 4,546,606 A | 10/1985 | Bouiller et al. | |
| 5,277,544 A | 1/1994 | Naudet | |
| 6,688,846 B2* | 2/2004 | Caubet | F01D 17/16 403/286 |
| 2007/0292264 A1 | 12/2007 | Bouru | |
| 2012/0251297 A1* | 10/2012 | Major | F04D 29/563 415/148 |

(Continued)

FOREIGN PATENT DOCUMENTS

EP 2204550 7/2010

OTHER PUBLICATIONS

European Patent Office, European Office Action dated Oct. 4, 2018 in Application No. 17152302.0-1006.

(Continued)

*Primary Examiner* — Justin D Seabe
(74) *Attorney, Agent, or Firm* — Snell & Wilmer L.L.P.

(57) ABSTRACT

A variable vane stabilizer is disclosed. One or more variable vane stabilizer may be interconnected between/among two or more vanes of a gas turbine engine in order to fix the angle of attack of the vanes.

3 Claims, 12 Drawing Sheets

(56) References Cited

U.S. PATENT DOCUMENTS

2014/0286745 A1    9/2014   Rusovici
2015/0098813 A1*   4/2015   Jarrett, Jr. ............. F01D 17/162
                                                                                                                                                                               415/209.3

OTHER PUBLICATIONS

Extended European Search Report dated May 29, 2017 in European Application No. 17152302.0.
USPTO, Notice of Allowance dated Mar. 7, 2019 in U.S. Appl. No. 15/004,709.
USPTO, Non-Final Rejection dated Feb. 4, 2019 in U.S. Appl. No. 15/004,709.
USPTO, Requirement for Restriction/Election dated Nov. 9, 2018 in U.S. Appl. No. 15/004,709.

* cited by examiner

VARIABLE VANE STABILIZER

CROSS-REFERENCE TO RELATED APPLICATIONS

This application is a divisional of, and claims priority to, U.S. application Ser. No. 15/004,709, filed Jan. 22, 2016 and entitled "VARIABLE VANE STABLIZER" and which is hereby incorporated by reference in its entirety.

FIELD

The present disclosure relates generally to mechanisms to position structures within gas turbine engines and more specifically, to a variable vane stabilizer to affix the position of variable vanes.

BACKGROUND

A gas turbine engine implements rotors and stators at various positions throughout the engine. Frequently a gas turbine engine may share similar parts with other gas turbine engines. Moreover, some gas turbine engines may have vanes with variable vane angle (e.g., angle of attack of vane airfoil relative to airflow). Some gas turbine engines may have vanes with fixed vane angle. Moreover, further gas turbine engines may have different vanes with different vane angles. Producing different vane parts for the different scenarios is costly and hampers repair and retrofit operations.

SUMMARY

A variable vane stabilizer is disclosed. The variable vane stabilizer may include a first nearest neighbor attachment configured to connect to a first adjacent variable vane stabilizer, a second nearest neighbor attachment configured to connect to a second adjacent variable vane stabilizer, a circumferential extension member disposed between the first nearest neighbor attachment and the second nearest neighbor attachment and spacing apart the first nearest neighbor attachment and the second nearest neighbor attachment, and a vane stem interface configured to attach the variable vane stabilizer to a vane wherein an angle of attack of the vane is fixed.

In various embodiments, the first nearest neighbor attachment may include a reciprocal plane tang including a tang extending circumferentially outward from the variable vane stabilizer, and a slip channel including an aperture disposed perpendicularly through the tang and configured to permit insertion of a fastener. The second nearest neighbor attachment may include a first reciprocal plane fork and a second reciprocal plane fork extending circumferentially outward from the variable vane stabilizer, and a slip channel disposed through each of the first reciprocal plane fork and the second reciprocal plane fork and including an aperture configured to permit insertion of a fastener. The vane stem interface may include an axial keyed channel extending through a portion of the variable vane stabilizer and configured to receive a portion of the vane. The vane stem interface may further include keying tangs including bosses extending inwardly toward a center of the axial keyed channel and configured to press against a portion of the vane, and an expansion chamfer including a relief undercut between the keying tangs and a radially outermost face of the axial keyed channel.

In various embodiments, the first nearest neighbor attachment includes an abutment surface including a planar face of a circumferentially outermost surface of the variable vane stabilizer and configured to receive the second nearest neighbor attachment of the first adjacent variable vane stabilizer in contact radially outward of the abutment surface. In various embodiments, the second nearest neighbor attachment includes a fastener channel extending through a distal end of the circumferential extension member and configured to receive a fastener. The second nearest neighbor attachment may include a preload spacer radially outward of the fastener channel. Moreover, the circumferential extension member may include a planar flex member wherein a larger surface of the planar flex member lies in a generally circumferential plane and a smaller surface of the planar flex member lies in a generally radial plane.

In various embodiments, the second nearest neighbor attachment includes a first reciprocal plane fork and a second reciprocal plane fork extending circumferentially outward from the variable vane stabilizer, a slip channel disposed through each of the first reciprocal plane fork and the second reciprocal plane fork and including an aperture configured to permit insertion of a fastener. The circumferential extension member may include a constrained flex member including a portion of the first reciprocal plane fork and a portion of the second reciprocal plane fork each configured to permit flexing of the variable vane stabilizer.

In various embodiments, the first nearest neighbor attachment includes a radial tab extending radially outward from the variable vane stabilizer, and a trunnion receiving bearing including a bearing disposed in an aperture through the radial tab. The second nearest neighbor attachment may include a radial tab extending radially outward from the variable vane stabilizer, and a trunnion including a shaft extending from the radial tab perpendicular to the radial tab and configured to be received in a trunnion receiving bearing of the first adjacent variable vane stabilizer.

A variable vane stabilizer may have a circumferential extension member bounded by a first vane stem interface and a second vane stem interface disposed at opposite distal ends of the circumferential extension member. The circumferential extension member may include a planar flex member wherein a larger surface of the planar flex member lies in a generally circumferential plane and a smaller surface of the planar flex member lies in a generally radial plane. Each vane stem interface may include an axial keyed channel extending through a portion of the variable vane stabilizer and configured to receive a portion of a vane. Each vane stem interface may include a circumferential keyed channel extending through a portion of the variable vane stabilizer and longitudinally aligned along a primary axis of the variable vane stabilizer.

A method of variable vane stabilizer installation is disclosed. The method may include attaching a first variable vane stabilizer to a first vane, attaching a second variable vane stabilizer to a second vane adjacent to the first vane, attaching a third variable vane stabilizer to a third vane adjacent to the second vane, and linking the first variable vane stabilizer, second variable vane stabilizer, and third variable vane stabilizer.

The linking may include connecting a first nearest neighbor attachment of the first variable vane stabilizer to a second nearest neighbor attachment of the second variable vane stabilizer, and connecting a first nearest neighbor attachment of the second variable vane stabilizer to a second nearest neighbor attachment of the third variable vane stabilizer.

The first variable vane stabilizer, the second variable vane stabilizer, and the third variable vane stabilizer each may include a circumferential extension member disposed between the first nearest neighbor attachment and the second nearest neighbor attachment and spacing apart the first nearest neighbor attachment and the second nearest neighbor attachment, and a vane stem interface configured to attach the variable vane stabilizer to a vane. In various embodiments, the first vane has a first angle of attack, the second vane has a second angle of attack, the third vane has a third angle of attack, and the first, second, and third angle of attack are the same.

BRIEF DESCRIPTION OF THE DRAWINGS

The subject matter of the present disclosure is particularly pointed out and distinctly claimed in the concluding portion of the specification. A more complete understanding of the present disclosure, however, is best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice embodiments of the disclosure, it should be understood that other embodiments may be realized and that logical changes and adaptations in design and construction may be made in accordance with this invention and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, any reference to singular includes plural embodiments, and any reference to more than one component or step may include a singular embodiment or step. Surface shading lines may be used throughout the figures to denote different parts but not necessarily to denote the same or different materials.

Figure 1:
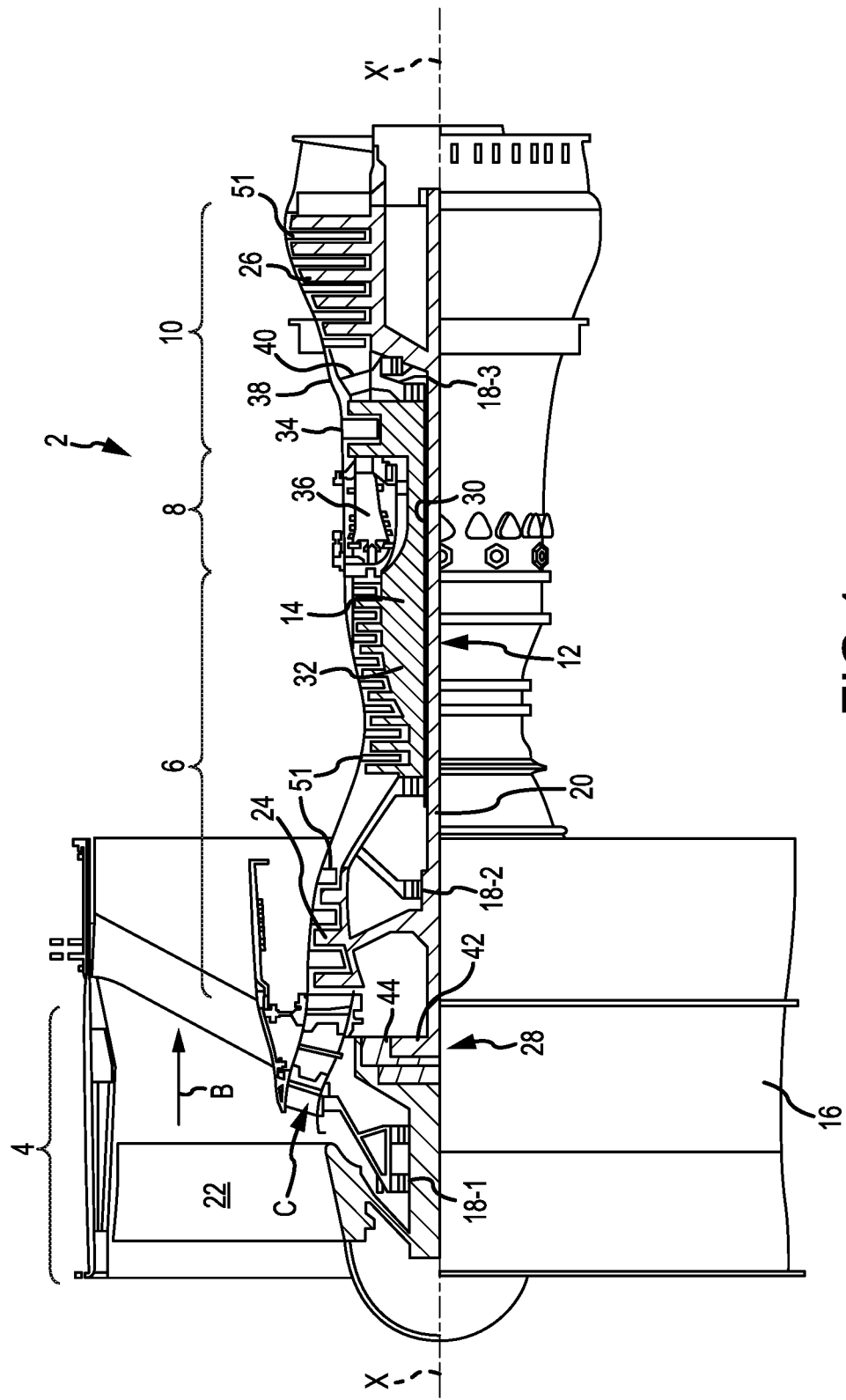
FIG. 1 illustrates a cross-sectional view of an exemplary gas turbine engine, according to various embodiments.

With reference to FIG. 1, an exemplary gas turbine engine 2 is provided. Gas turbine engine 2 is a two-spool turbofan that generally incorporates a fan section 4, a compressor section 6, a combustor section 8 and a turbine section 10. Vanes 51 may be disposed throughout the gas turbine engine 2. Alternative engines include, for example, an augmentor section among other systems or features. In operation, fan section 4 drives air along a bypass flow-path B while compressor section 6 drives air along a core flow-path C for compression and communication into combustor section 8 then expansion through turbine section 10. Although depicted as a turbofan gas turbine engine 2 herein, it should be understood that the concepts described herein are not limited to use with turbofans as the teachings is applicable to other types of turbine engines including three-spool architectures. A gas turbine engine may comprise an industrial gas turbine (IGT) or a geared aircraft engine, such as a geared turbofan, or non-geared aircraft engine, such as a turbofan, or may comprise any gas turbine engine as desired.

Gas turbine engine 2 generally comprises a low speed spool 12 and a high speed spool 14 mounted for rotation about an engine central longitudinal axis X-X' relative to an engine static structure 16 via several bearing systems 18-1, 18-2, and 18-3. It should be understood that bearing systems may alternatively and/or additionally be provided at various locations, including for example, bearing system 18-1, bearing system 18-2, and bearing system 18-3.

Low speed spool 12 generally comprises an inner shaft 20 that interconnects a fan 22, a low pressure compressor section 24, e.g., a first compressor section, and a low pressure turbine section 26, e.g., a second turbine section. Inner shaft 20 is connected to fan 22 through a geared architecture 28 that drives the fan 22 at a lower speed than low speed spool 12. Geared architecture 28 comprises a gear assembly 42 enclosed within a gear housing 44. Gear assembly 42 couples the inner shaft 20 to a rotating fan structure. High speed spool 14 comprises an outer shaft 30 that interconnects a high pressure compressor section 32, e.g., second compressor section, and high pressure turbine section 34, e.g., first turbine section. A combustor 36 is located between high pressure compressor section 32 and high pressure turbine section 34. A mid-turbine frame 38 of engine static structure 16 is located generally between high pressure turbine section 34 and low pressure turbine section 26. Mid-turbine frame 38 supports one or more bearing systems 18, such as 18-3, in turbine section 10. Inner shaft 20 and outer shaft 30 are concentric and rotate via bearing systems 18 about the engine central longitudinal axis X-X', which is collinear with their longitudinal axes. As used herein, a "high pressure" compressor or turbine experiences a higher pressure than a corresponding "low pressure" compressor or turbine.

The core airflow C is compressed by low pressure compressor section 24 then high pressure compressor section 32, mixed and burned with fuel in combustor 36, then expanded over high pressure turbine section 34 and low pressure turbine section 26. Mid-turbine frame 38 includes surface structures 40, which are in the core airflow path. Turbines 26, 34 rotationally drive the respective low speed spool 12 and high speed spool 14 in response to the expansion.

Gas turbine engine 2 is, for example, a high-bypass geared aircraft engine. The bypass ratio of gas turbine engine 2 is optionally greater than about six (6). The bypass ratio of gas turbine engine 2 is optionally greater than ten (10). Geared architecture 28 is an epicyclic gear train, such as a star gear system, e.g., sun gear in meshing engagement with a plurality of star gears supported by a carrier and in meshing engagement with a ring gear, or other gear system. Geared architecture 28 has a gear reduction ratio of greater than about 2.3 and low pressure turbine section 26 has a pressure ratio that is greater than about five (5). The bypass ratio of gas turbine engine 2 is greater than about ten (10:1). The diameter of fan 22 is significantly larger than that of the low pressure compressor section 24, and the low pressure turbine section 26 has a pressure ratio that is greater than about 5:1. Low pressure turbine section 26 pressure ratio is measured prior to inlet of low pressure turbine section 26 as related to the pressure at the outlet of low pressure turbine section 26 prior to an exhaust nozzle. It should be understood, however, that the above parameters are exemplary of a suitable geared architecture engine and that the present disclosure contemplates other turbine engines including direct drive turbofans.

An engine 2 may comprise a rotor blade 68 or a stator vane 51. Stator vanes 51 may be arranged circumferentially about the engine central longitudinal axis X-X'. Stator vanes 51 may be variable, meaning the angle of attack of the airfoil of the stator vane may be variable relative to the airflow proximate to the stator vanes 51. The angle of attack of the variable stator vane 51 may be variable during operation, or may be fixable for operation, for instance, being variable during maintenance or construction and fixable for operation. In various embodiments, it may be desirable to affix a variable vane 51 in fixed position (e.g., constant angle of attack).

Figure 2:
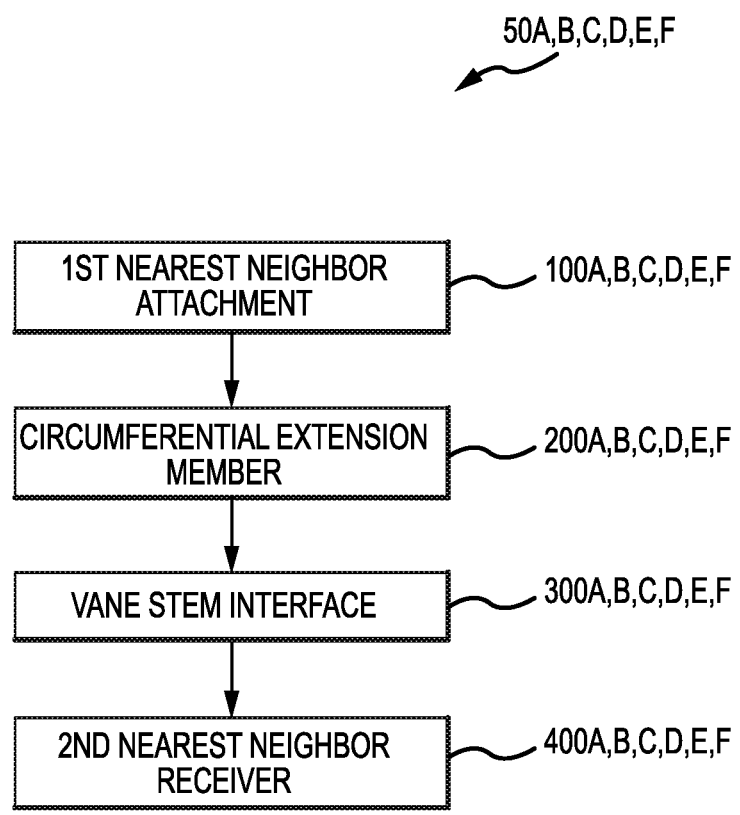
FIG. 2 illustrates an example block diagram of an example variable vane stabilizer, according to various embodiments.
Figure 3A:
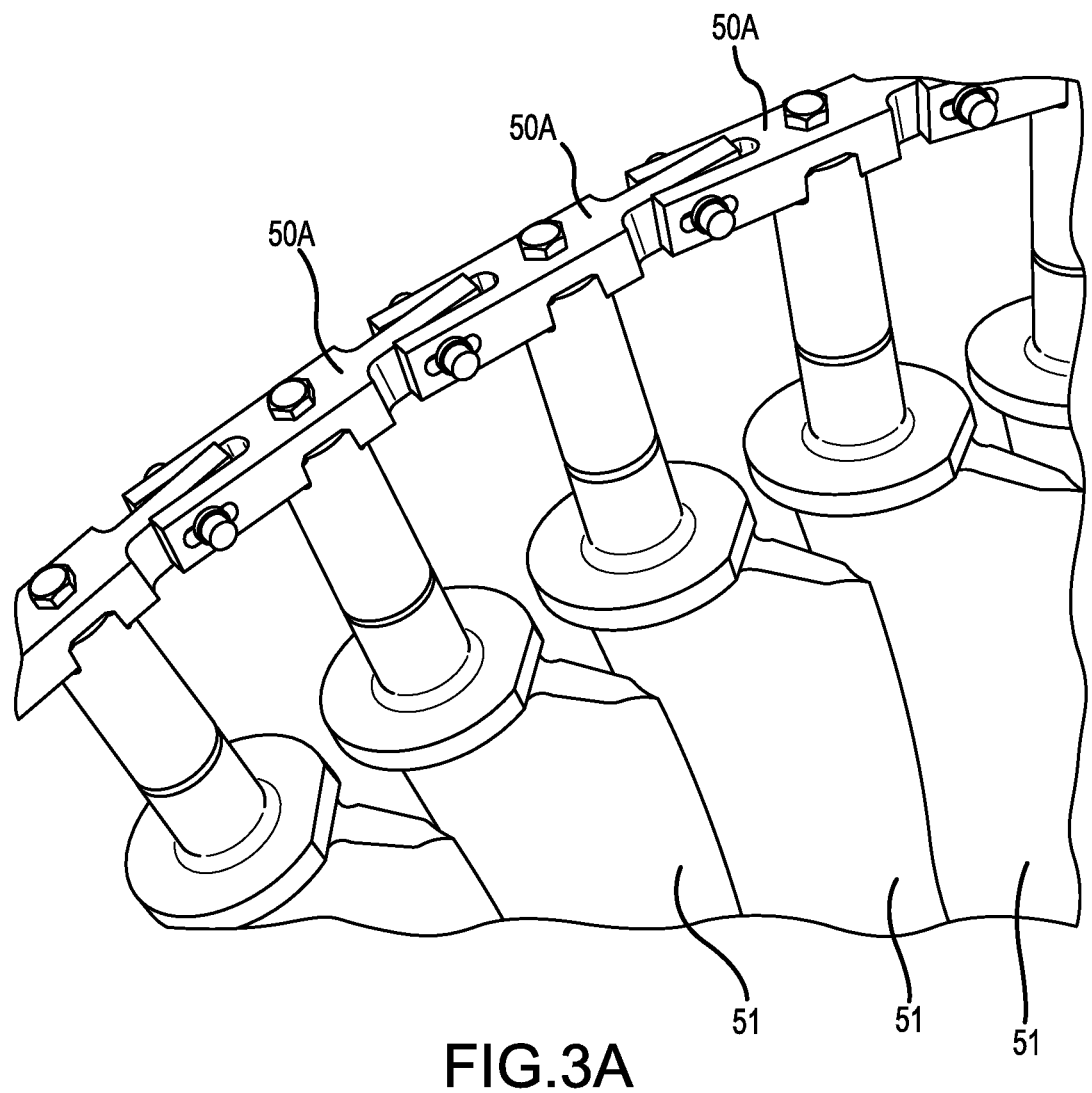
FIGS. 3A-B illustrate a variable vane stabilizer with a billet configuration, in accordance with various embodiments.

With reference to FIG. 2, a block diagram of a variable vane stabilizer 50A, 50B, 50C, 50D, 50E, 50F is disclosed. As will be discussed further herein, a variable vane stabilizer may be interconnected between/among two or more vanes in order to fix the angle of attack of the vanes. While various embodiments will be discussed herein, and the discussion of various aspects of variable vane stabilizers may be limited to specific embodiments for brevity, features of different embodiments are not limited to the specifically indicated embodiments, but may be combined with features of other embodiments in various combinations. For instance, aspects of a variable vane stabilizer 50A may be combined with aspects of a variable vane stabilizer 50B. As used herein, like numerals may denote like features. For instance, while FIG. 3A depicts a plurality of variable vane stabilizers 50A interconnected in combination with vanes 51, any variable vane stabilizer 50A, 50B, 50C, 50D, 50E, 50F may be similarly situated.

A variable vane stabilizer 50A, 50B, 50C, 50D, 50E, 50F may include a first nearest neighbor attachment 100A, 100B, 100C, 100D, 100E, or 100F, respectively. Adjacent variable vane stabilizers may be desired to be interconnected. Thus, a variable vane stabilizer may also have a second nearest neighbor attachment 400A, 400B, 400C, 400D, 400E, 400F configured to interconnect to a first nearest neighbor attachment 100A, 100B, 100C, 100D, 100E, or 100F of an adjacent neighbor. A variable vane stabilizer 50A, 50B, 50C, 50D, 50E, 50F may include a vane stem interface 300A, 300B, 300C, 300D, 300E, 300F configured to join the variable vane stabilizer to a vane 51, wherein the angle of attack of the vane is fixed. Finally, a variable vane stabilizer 50A, 50B, 50C, 50D, 50E, 50F may have a circumferential extension member 200A, 200B, 200C, 200D, 200E, 200F. The circumferential extension member 200A, 200B, 200C, 200D, 200E, 200F may be disposed between the first and second nearest neighbor attachments and may extend generally circumferentially relative to the engine central longitudinal axis X-X' in order to space apart the first nearest neighbor attachment and the second nearest neighbor attachment, whereby the adjacent variable vane stabilizers may be joined in a generally annular arrangement. The circumferential extension member may be configured to flex so that the otherwise generally linear variable vane stabilizers may be arranged generally annularly.

A variable vane stabilizer thus may perform several functions. For instance, a variable vane stabilizer may lock two or more adjacent vanes together, fixing their individual angles of attack using existing features of the vanes. Moreover, the variable vane stabilizer addresses the challenge associated with the variable spacing between the vanes due to being located in a split case of a gas turbine engine. As will be discussed further herein, various aspects of the variable vane stabilizers may be associated with preloading. For instance, to provide system damping, adjacent variable vane stabilizers may be preloaded against preload spacers, allowing thermal growth in the system.

Generally, the variable vane stabilizers may be installed as follows. A variable vane stabilizer may be attached to a first vane with the first blade angle of attack positioned such that it aligns with an adjacent blade. The variable vane stabilizers of the first vane and the second vane may then be linked. This may be repeated for each variable vane, and finally the fasteners for each variable vane stabilizer are inserted and tightened, preloading the annular arrangement of adjacent variable vane stabilizers.

Billet Variable Vane Stabilizer

Figure 3B:
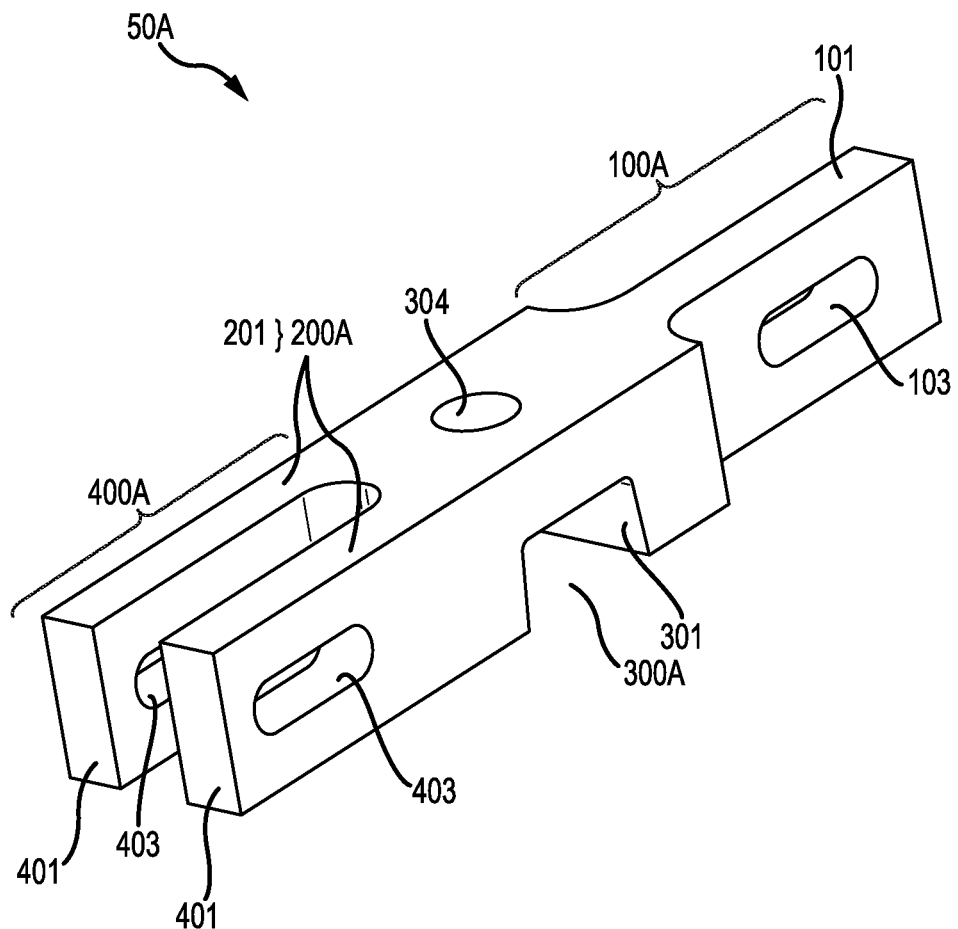

With reference to FIG. 3B, a billet variable vane stabilizer 50A is disclosed. A billet variable vane stabilizer 50A may comprise a first nearest neighbor attachment 100A, a circumferential extension member 200A, a vane stem interface 300A, and a second nearest neighbor attachment 400A.

The first nearest neighbor attachment 100A may comprise a reciprocal plane tang 101. A reciprocal plane tang 101 may comprise a tang extending circumferentially outward from a billet variable vane stabilizer 50A. The first nearest neighbor attachment 100A may also include a slip channel 103 comprising an aperture disposed perpendicularly through the tang (e.g., aligned to permit insertion of a fastener parallel with the engine central longitudinal axis X-X').

The second nearest neighbor attachment 400A may comprise reciprocal plane forks 401. In various embodiments, two reciprocal plane forks 401 (a first reciprocal plane fork 401 and a second reciprocal plane fork 401) extend circumferentially outward from a billet variable vane stabilizer 50A in a direction opposite to the reciprocal plane tang 101. The reciprocal plane forks 401 may be spaced apart so that a reciprocal plane tang 101 of an adjacent billet variable vane stabilizer 50A may be insertable between the reciprocal plane forks 401. A slip channel 403 may be disposed through each reciprocal plane fork 401 and positioned so that a fastener may be inserted through each reciprocal plane fork 401 and the reciprocal plane tang 101 of an adjacent billet variable vane stabilizer 50A. In this manner, adjacent billet variable vane stabilizers 50A may be interconnected. Moreover, the slip channel 403 and/or the slip channel 103 may comprise a channel having a length that is longer than a width, the length extending in a generally circumferential direction relative to the engine central longitudinal axis X-X'. In this manner, the billet variable vane stabilizers 50A may be configured to permit relative motion of the adjacent billet variable vane stabilizers 50A in a single degree of freedom (e.g., circumferential growth, and/or corresponding radial growth, and/or such as to accommodate thermal effects and to accommodate an angle between the vanes resulting from the annular arrangement of the vanes) while precluding twisting. A vane 51 may be attached to each vane stem interface 300A so that in this manner twisting of the vanes 51 is constrained, whereas circumferential or radial motion of the vanes 51, such as in response to differential coefficients of thermal expansion, may be permitted.

The vane stem interface 300A may comprise an axial keyed channel 301. An axial keyed channel 301 may comprise a channel extending through a portion of the billet variable vane stabilizer 50A and parallel to the engine central longitudinal axis X-X' (as opposed to lying in a circumferential plane). A vane 51 may be received into the axial keyed channel 301 and affixed in positon by a fastener, such as may be insertable through a fastener aperture 304 of the vane stem interface 300A.

The circumferential extension member 200A may comprise a constrained flex member 201. A constrained flex member 201 may permit limited flexing of the billet variable vane stabilizer 50A in one or more degree(s) of freedom, such as to accommodate thermal effects and to accommodate an angle between the vanes (for instance, an angle resulting from the annular arrangement of the vanes), and may limit flexing of the billet variable vane stabilizer 50A in one or more other degrees of freedom. For instance, as depicted in FIG. 3B, the circumferential extension member 200A is a portion of the reciprocal plane forks 401, so that movement in a radial direction is constrained. Thus, the circumferential extension member 200A and the relationship of the slip channels 103, 403, may combine to permit limited movement in a circumferential direction, while limiting movement in other directions.

Fork and Shoulder Variable Vane Stabilizer

Figure 4:
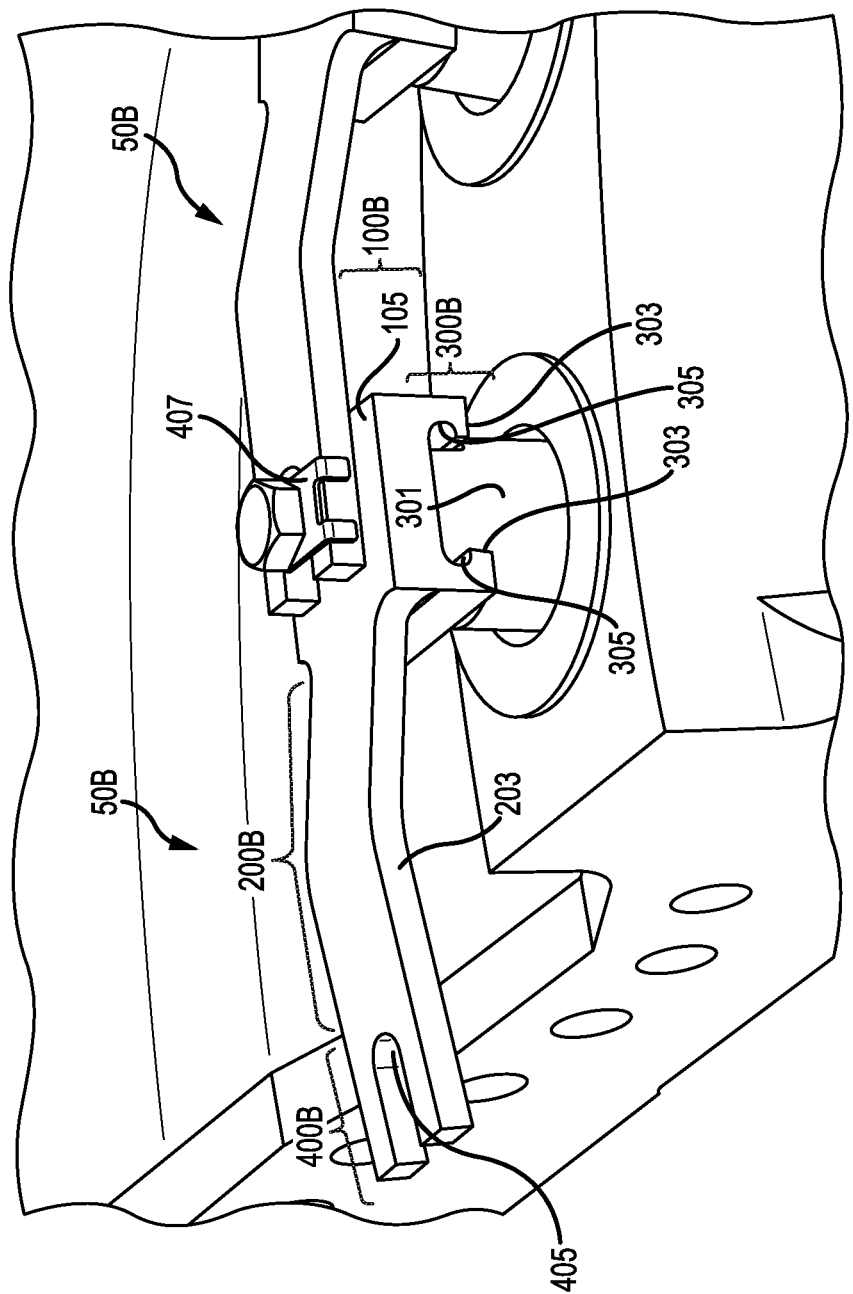
FIG. 4 illustrates a variable vane stabilizer with a fork and shoulder bolt configuration, in accordance with various embodiments.

With reference to FIG. 4, a fork and shoulder variable vane stabilizer 50B is disclosed. A fork and shoulder variable vane stabilizer 50B may be configured to exhibit various characteristics, for instance, such an arrangement further accommodates tolerance stack up during assembly and thermal growth. Flexibility is sufficient for vibration damping and in various embodiments, no modification to a vane trunnion to vane stem interface 300B would be implemented, enhancing retrofit installations. A fork and shoulder variable vane stabilizer 50B may comprise a first nearest neighbor attachment 100B, a circumferential extension member 200B, a vane stem interface 300B, and a second nearest neighbor attachment 400B.

The first nearest neighbor attachment 100B may comprise an abutment surface 105. An abutment surface 105 may comprise a planar face of a circumferentially outermost surface of the fork and shoulder variable vane stabilizer 50B (e.g., a shoulder). The abutment surface 105 may be positioned so that a second nearest neighbor attachment 400B of an adjacent fork and shoulder variable vane stabilizer 50B may rest atop (circumferentially outboard of) the abutment surface 105.

The second nearest neighbor attachment 400B may comprise a fastener channel 405 extending through a distal end of the circumferential extension member 200B of an adjacent fork and shoulder variable vane stabilizer 50B. The fastener channel 405 may be configured to receive a fastener inserted in a radial direction through the fastener channel 405 and into an aperture in the abutment surface 105 of the adjacent fork and shoulder variable vane stabilizer. The fastener may extend into a portion of a vane 51, whereby the fork and shoulder variable vane stabilizer may be connected to the vane. In various embodiments, the second nearest neighbor attachment 400B further comprises a preload spacer 407, disposed radially outward of the fastener channel 405 and configured to interoperate with a fastener 457 to exert a preload on the fork and shoulder variable vane stabilizer 50B and to dampen movement of the fork and shoulder variable vane stabilizer 50B.

The circumferential extension member 200B may comprise a planar flex member 203. The planar flex member 203 may comprise a planar member lying in a generally circumferential plane, wherein a larger surface of the planar member lies in the generally circumferential plane (e.g., forming an partially annular section) and wherein a smaller surface of the planar member lies in a generally radial plane (e.g., forming a plane in which a radial line extending from the engine central longitudinal axis X-X' lies). In this manner, planar flex member 203 may be configured to permit the relative motion of adjacent fork and shoulder variable vane stabilizers 50B in some degrees of freedom, but not others (for instance, circumferential growth, and/or corresponding radial growth) while precluding twisting. A vane 51 may be attached to each vane stem interface 300B so that in this manner twisting of the vanes 51 is constrained, whereas circumferential or radial motion of the vanes 51, such as in response to differential coefficients of thermal expansion, may be permitted.

The vane stem interface 300B may comprise an axial keyed channel 301. An axial keyed channel 301 may comprise a channel extending through a portion of the fork and shoulder variable vane stabilizers 50B and parallel to the engine central longitudinal axis X-X' (as opposed to lying in a circumferential plane). A vane 51 may be received into the axial keyed channel 301 and affixed in positon by a fastener, such as may be insertable through a fastener aperture of the vane stem interface 300B. In various embodiments, this fastener aperture is the fastener channel 405. The vane stem interface 300B may comprise keying tangs 303 and an expansion chamfer 305. Keying tangs 303 may comprise bosses extending inwardly toward the center of the axial keyed channel 301 and configured to press against a portion of the vane 51 such as a vane stem. The expansion chamfer 305 may comprise a relief undercut between each keying tang and the floor (e.g., radially outermost face) of the axial keyed channel 301. In this manner, thermal expansion of aspects of the vane and the bolted clevis variable vane stabilizer 50B may be compensated, such as in response to preloading the keying tangs 303 against the portion of the vane 51 such as the vane stem.

Bolted Clevis Variable Vane Stabilizer

Figure 5:
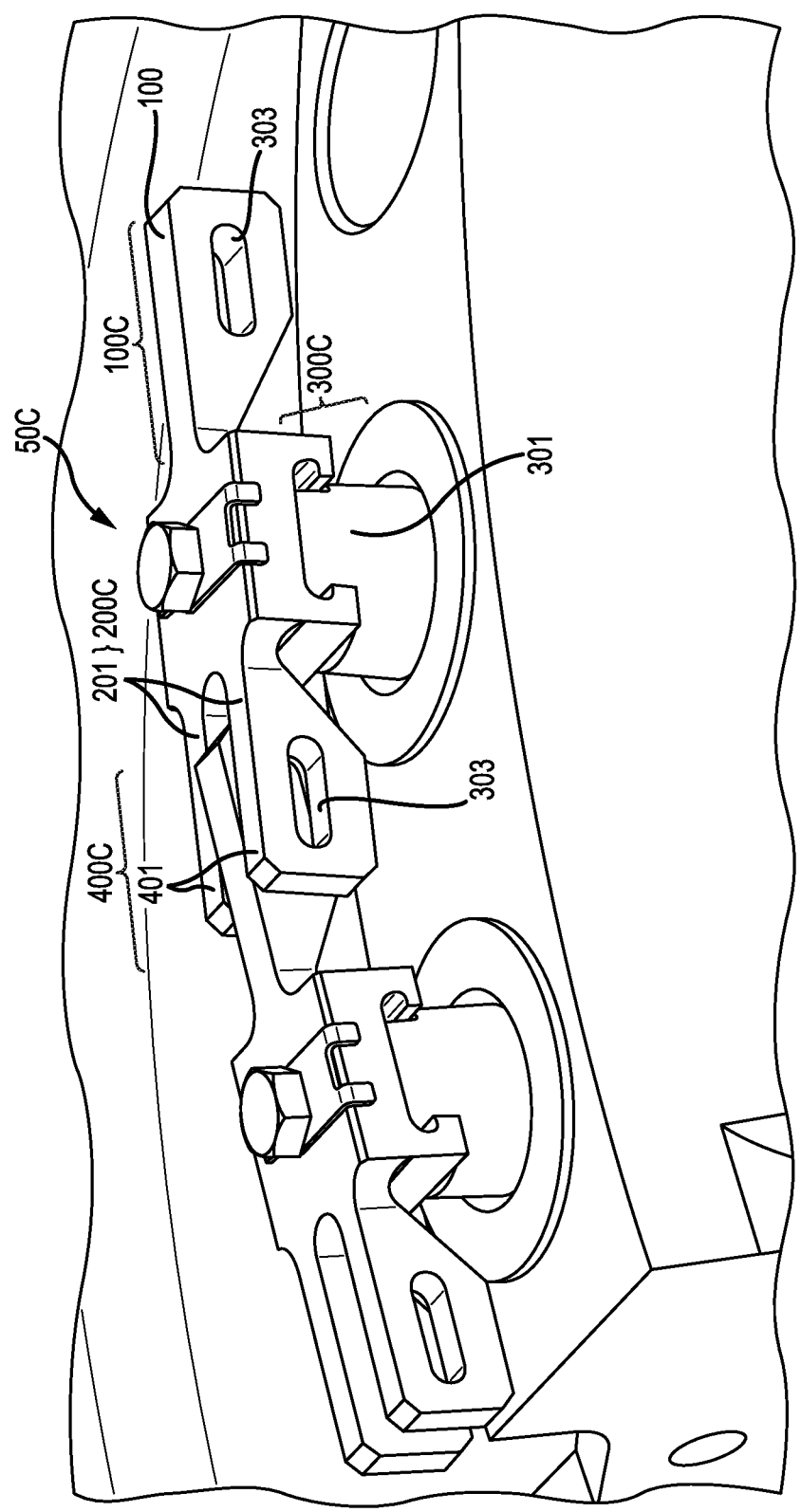
FIG. 5 illustrates a variable vane stabilizer with a bolted clevis configuration, in accordance with various embodiments.

With reference to FIG. 5, a bolted clevis variable vane stabilizer 50C is disclosed. A bolted clevis variable vane stabilizer 50C may be configured to exhibit various characteristics, for instance, such an arrangement further accommodates tolerance stack up during assembly and thermal growth. Flexibility is sufficient for vibration damping and in various embodiments, no modification to a vane trunnion to vane stem interface 300C would be implemented, enhancing retrofit installations. A bolted clevis variable vane stabilizer 50C may comprise a first nearest neighbor attachment 100C, a circumferential extension member 200C, a vane stem interface 300C, and a second nearest neighbor attachment 400C.

The first nearest neighbor attachment 100C may comprise a reciprocal plane tang 101. A reciprocal plane tang 101 may comprise a tang extending circumferentially outward from a bolted clevis variable vane stabilizer 50C. A slip channel 103 may comprise an aperture disposed perpendicularly through the tang (e.g., aligned to permit insertion of a fastener parallel with the engine central longitudinal axis X-X').

The second nearest neighbor attachment 400C may comprise one or more reciprocal plane forks 401. In various embodiments, two reciprocal plane forks 401 extend circumferentially outward from a bolted clevis variable vane stabilizer 50C in a direction opposite to the reciprocal plane tang 101. The reciprocal plane forks 401 may be spaced apart so that a reciprocal plane tang 101 of an adjacent bolted clevis variable vane stabilizer 50C may be insertable between the reciprocal plane forks 401. A slip channel 403 may be disposed through each reciprocal plane fork 401 and positioned so that a fastener may be inserted through each reciprocal plane fork 401 and the reciprocal plane tang 101 of an adjacent bolted clevis variable vane stabilizer 50C. In this manner, adjacent bolted clevis variable vane stabilizer 50C may be interconnected. Moreover, the slip channel 403 and/or the slip channel 103 may comprise a channel having a length that is longer than a width, the length extending in a generally circumferential direction relative to the engine central longitudinal axis X-X'. In this manner, the bolted clevis variable vane stabilizer 50C may be configured to permit relative motion of the adjacent bolted clevis variable vane stabilizer 50C in a single degree of freedom (e.g., circumferential growth, and/or corresponding radial growth, and/or such as to accommodate thermal effects and to accommodate an angle between the vanes resulting from the annular arrangement of the vanes) while precluding twisting. A vane 51 may be attached to each vane stem interface 300C so that in this manner twisting of the vanes 51 is constrained, whereas circumferential or radial motion of the vanes 51, such as in response to differential coefficients of thermal expansion, may be permitted.

The vane stem interface 300C may comprise an axial keyed channel 301. An axial keyed channel 301 may comprise a channel extending through a portion of the bolted clevis variable vane stabilizer 50C and parallel to the engine central longitudinal axis X-X' (as opposed to lying in a circumferential plane). A vane 51 may be received into the axial keyed channel 301 and affixed in positon by a fastener, such as may be insertable through a fastener aperture of the vane stem interface 300C. The vane stem interface 300C may comprise keying tangs 303 and an expansion chamfer 305. Keying tangs 303 may comprise bosses extending inwardly toward the center of the axial keyed channel 301 and configured to press against a portion of the vane 51 such as a vane stem. The expansion chamfer 305 may comprise a relief undercut between each keying tang and the floor (e.g., radially outermost face) of the axial keyed channel 301. In this manner, thermal expansion of aspects of the vane and the bolted clevis variable vane stabilizer 50C may be compensated, such as in response to preloading the keying tangs 303 against the portion of the vane 51 such as the vane stem.

The circumferential extension member 200C may comprise a constrained flex member 201. A constrained flex member 201 may permit limited flexing of the bolted clevis variable vane stabilizer 50C in one or more degree(s) of freedom, and may limit flexing of the bolted clevis variable vane stabilizer 50C in one or more other degree(s) of freedom. For instance, the circumferential extension member 200C is a portion of the reciprocal plane forks 401, so that movement in a radial direction is constrained. Thus, the circumferential extension member 200C and the relationship of the slip channels 103, 403, may combine to permit limited movement in a circumferential direction, while limiting movement in other directions.

Trunnion Shaft Variable Vane Stabilizer

Figure 6:
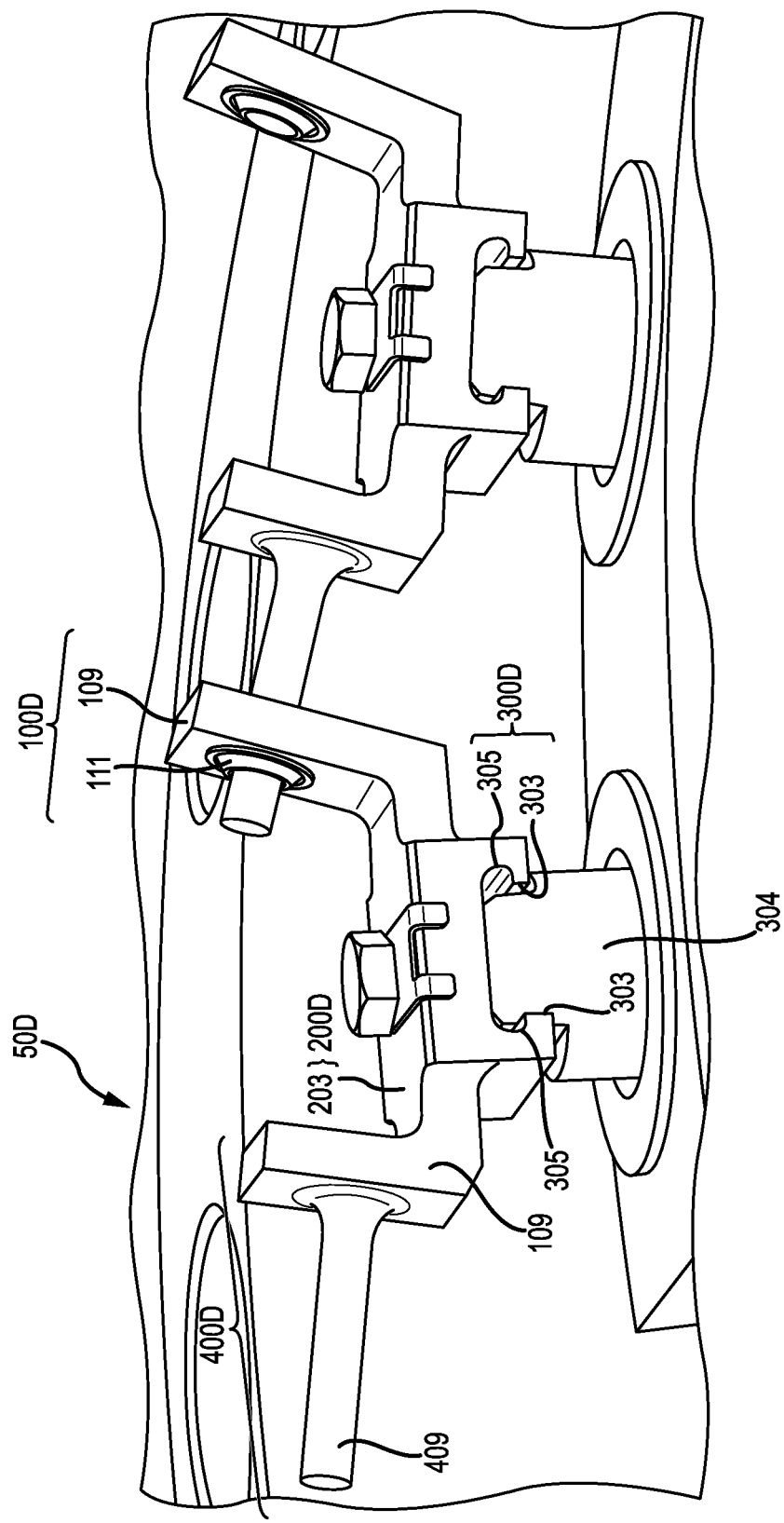
FIG. 6 illustrates a variable vane stabilizer with a trunnion shaft configuration, in accordance with various embodiments.

With reference to FIG. 6, a trunnion shaft variable vane stabilizer 50D is disclosed. A trunnion shaft variable vane stabilizer 50D may be configured to exhibit various characteristics, for instance, such an arrangement further accommodates tolerance stack up during assembly and thermal growth. Flexibility is sufficient for vibration damping and in various embodiments, no modification to a vane trunnion to vane stem interface 300D would be implemented, enhancing retrofit installations. A trunnion shaft variable vane stabilizer 50D may comprise a first nearest neighbor attachment 100D, a circumferential extension member 200D, a vane stem interface 300D, and a second nearest neighbor attachment 400D.

The first nearest neighbor attachment 100D may comprise a radial tab 109. A radial tab may comprise a tab that extends radially outward from the trunnion shaft variable vane stabilizer 50D relative to the engine central longitudinal axis X-X'. The first nearest neighbor attachment 100D may be disposed at a distal end of the trunnion shaft variable vane stabilizer 50D. Similarly, a second nearest neighbor attachment 400D may be disposed at the opposite distal end of the trunnion shaft variable vane stabilizer 50D and may similarly comprise a radial tab 109. Thus, a trunnion shaft variable vane stabilizer 50D may have a radial tab 109 at each distal end (e.g., the circumferentially outermost ends of the trunnion shaft variable vane stabilizer 50D relative to the engine central longitudinal axis X-X').

The first nearest neighbor attachment 100D may comprise a trunnion receiving bearing 111. A trunnion receiving bearing 111 may comprise a bearing disposed in an aperture through the radial tab 109.

The second nearest neighbor attachment 400D may further comprise a trunnion 409. The trunnion 409 may comprise a shaft extending generally outward from the radial tab 109 and perpendicular to the radial tab 109.

Thus, one may appreciate that the trunnion receiving bearing 111 may receive the trunnion 409 of an adjacent trunnion shaft variable vane stabilizer 50D. In this manner, the trunnion shaft variable vane stabilizers 50D may be configured to permit relative motion of the adjacent trunnion shaft variable vane stabilizers 50D in a single degree of freedom (e.g., circumferential growth, and/or corresponding radial growth, and/or such as to accommodate thermal effects and to accommodate an angle between the vanes resulting from the annular arrangement of the vanes) while precluding twisting. A vane 51 may be attached to each vane stem interface 300D so that in this manner twisting of the vanes 51 is constrained, whereas circumferential or radial motion of the vanes 51, such as in response to differential coefficients of thermal expansion, may be permitted.

The vane stem interface 300D may comprise an axial keyed channel 301. An axial keyed channel 301 may comprise a channel extending through a portion of the trunnion shaft variable vane stabilizers 50D and parallel to the engine central longitudinal axis X-X' (as opposed to lying in a circumferential plane). A vane 51 may be received into the axial keyed channel 301 and affixed in position by a fastener, such as may be insertable through a fastener aperture of the vane stem interface 300D.

The circumferential extension member 200D may comprise a planar flex member 203. A planar flex member 203 may permit limited flexing of the trunnion shaft variable vane stabilizer 50D in one or more degree(s) of freedom, and may limit flexing of the trunnion shaft variable vane stabilizer 50D in one or more other degree(s) of freedom. Thus, the circumferential extension member 200D and the relationship of the trunnion 409 and trunnion receiving bearing 111 may combine to permit limited movement in a circumferential direction, while limiting movement in other directions.

Axial Vane Trunnion Variable Vane Stabilizer

Figure 7A:
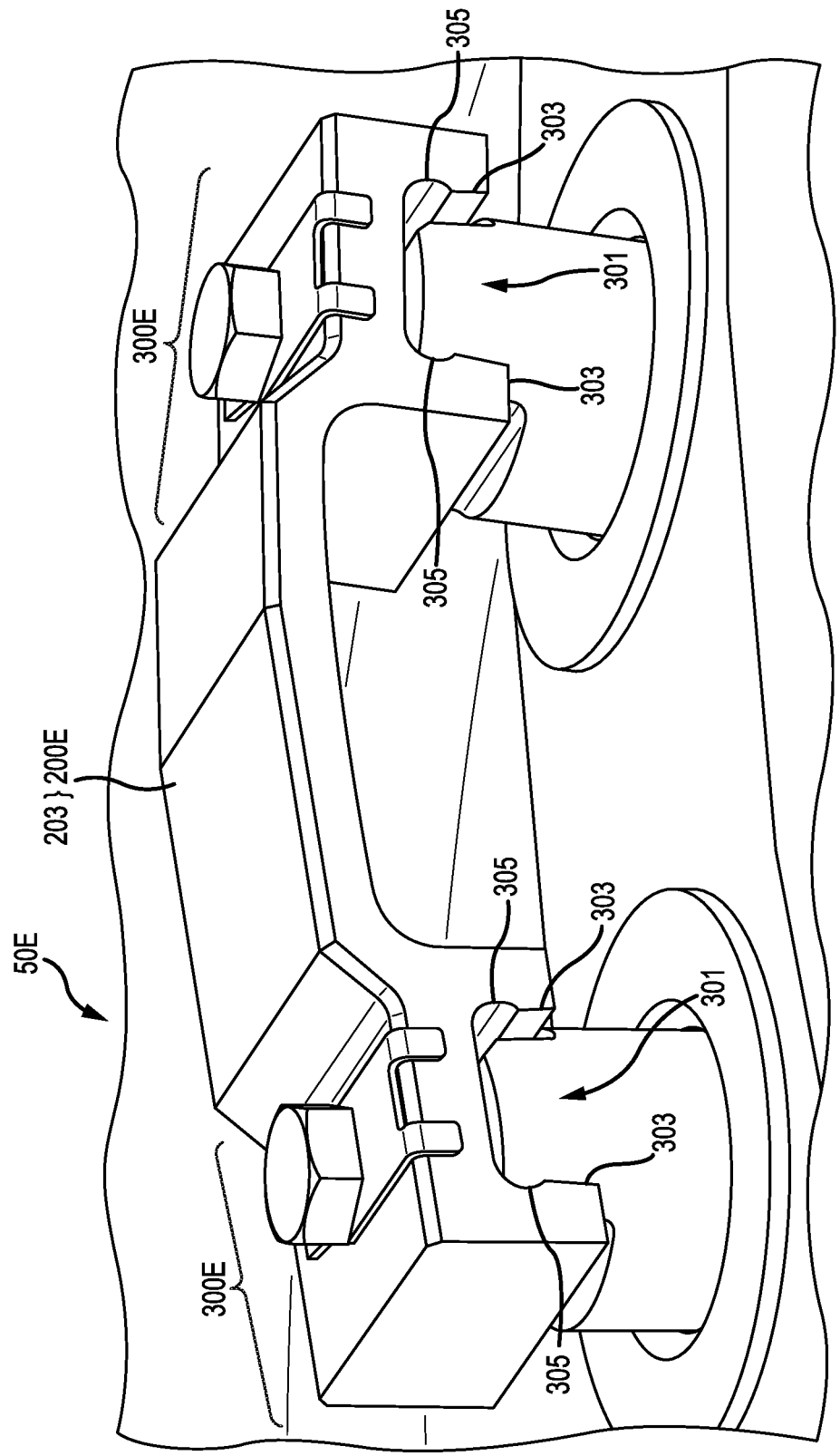
FIGS. 7A-B illustrate a variable vane stabilizer with an axial vane trunnion configuration, in accordance with various embodiments.
Figure 7B:
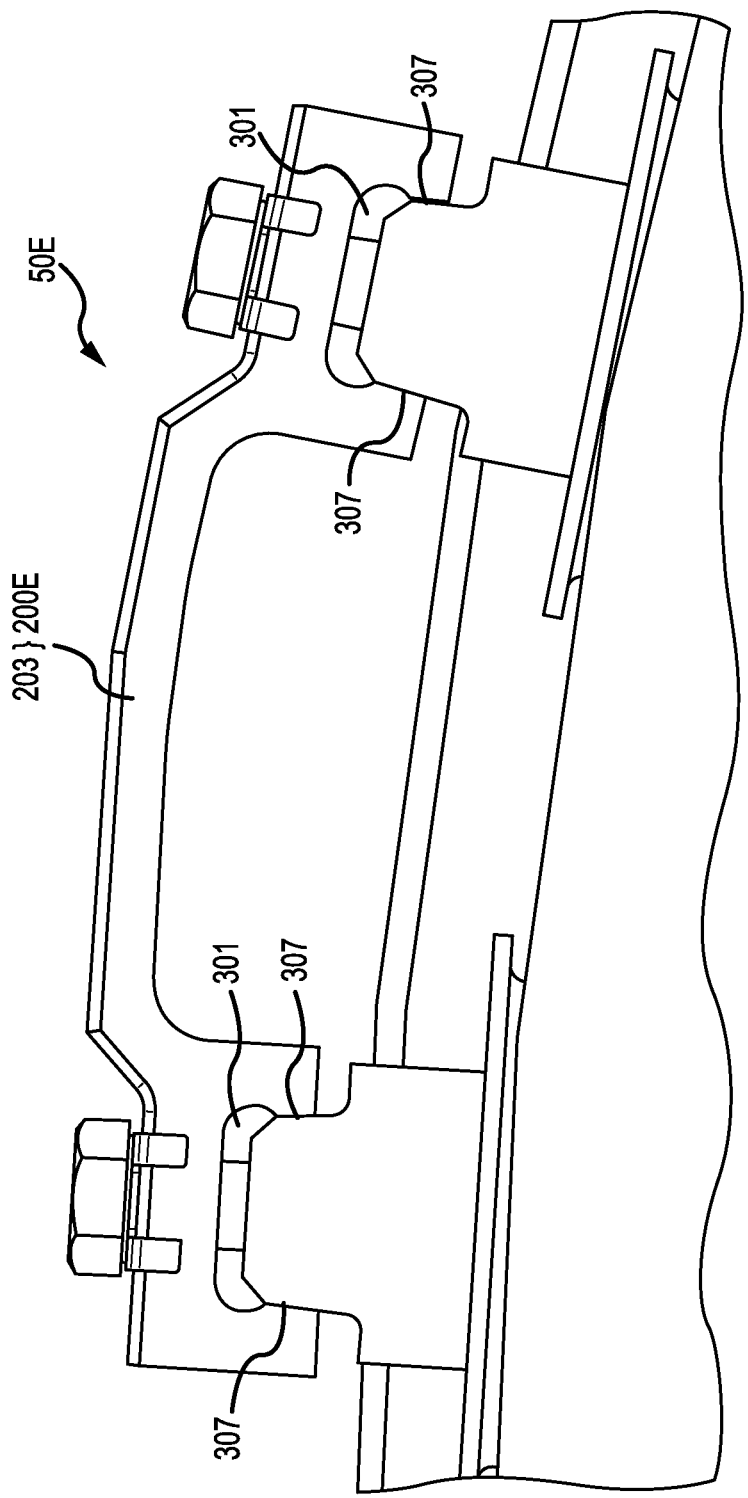

With reference to FIG. 7A-B, an axial vane trunnion variable vane stabilizer 50E is disclosed. An axial vane trunnion variable vane stabilizer 50E may comprise a circumferential extension member 200E bounded at each distal end by a vane stem interface 300E. Thus, one may appreciate that the nearest neighbor attachments 100E, 400E may be omitted and first and second vane stem interfaces 300E may bound the circumferential extension member 200E.

A circumferential extension member 200E may comprise a planar flex member 203. A planar flex member 203 may permit limited flexing of the axial vane trunnion variable vane stabilizer 50E in one or more degree(s) of freedom, and may limit flexing of the axial vane trunnion variable vane stabilizer 50E in one or more other degree(s) of freedom. Thus, the circumferential extension member 200E and the two vane stem interfaces 300E may combine to permit limited movement in a circumferential direction, while limiting movement in other directions.

Each vane stem interface 300E may comprise an axial keyed channel 301. An axial keyed channel 301 may comprise a channel extending through a portion of the axial vane trunnion variable vane stabilizer 50E and parallel to the engine central longitudinal axis X-X' (as opposed to lying in a circumferential plane). A vane 51 may be received into the axial keyed channel 301 and affixed in position by a fastener, such as may be insertable through a fastener aperture of the vane stem interface 300E.

Circumferential Vane Trunnion Variable Vane Stabilizer

Figure 8:
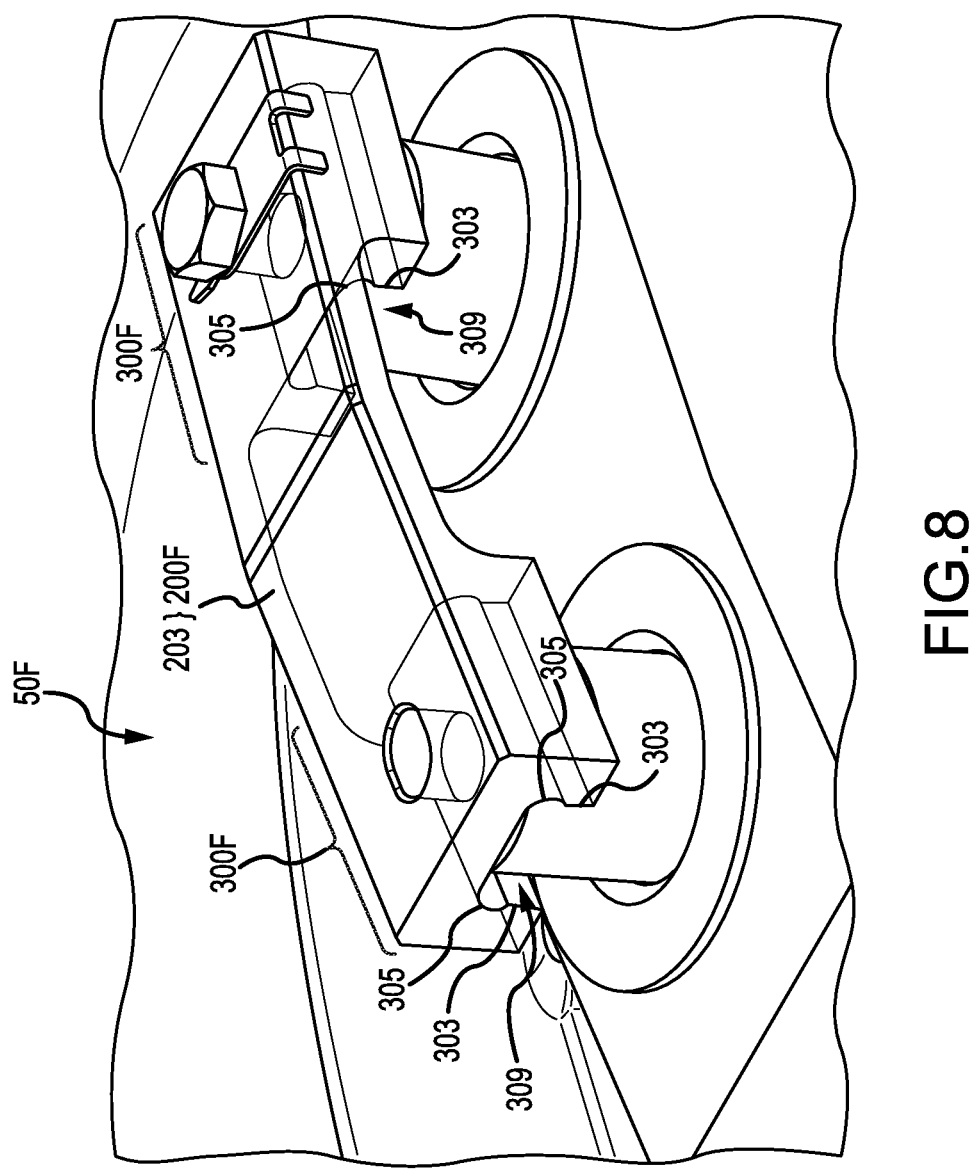
FIG. 8 illustrates a variable vane stabilizer with a circumferential vane trunnion configuration, in accordance with various embodiments.
Figure 9:
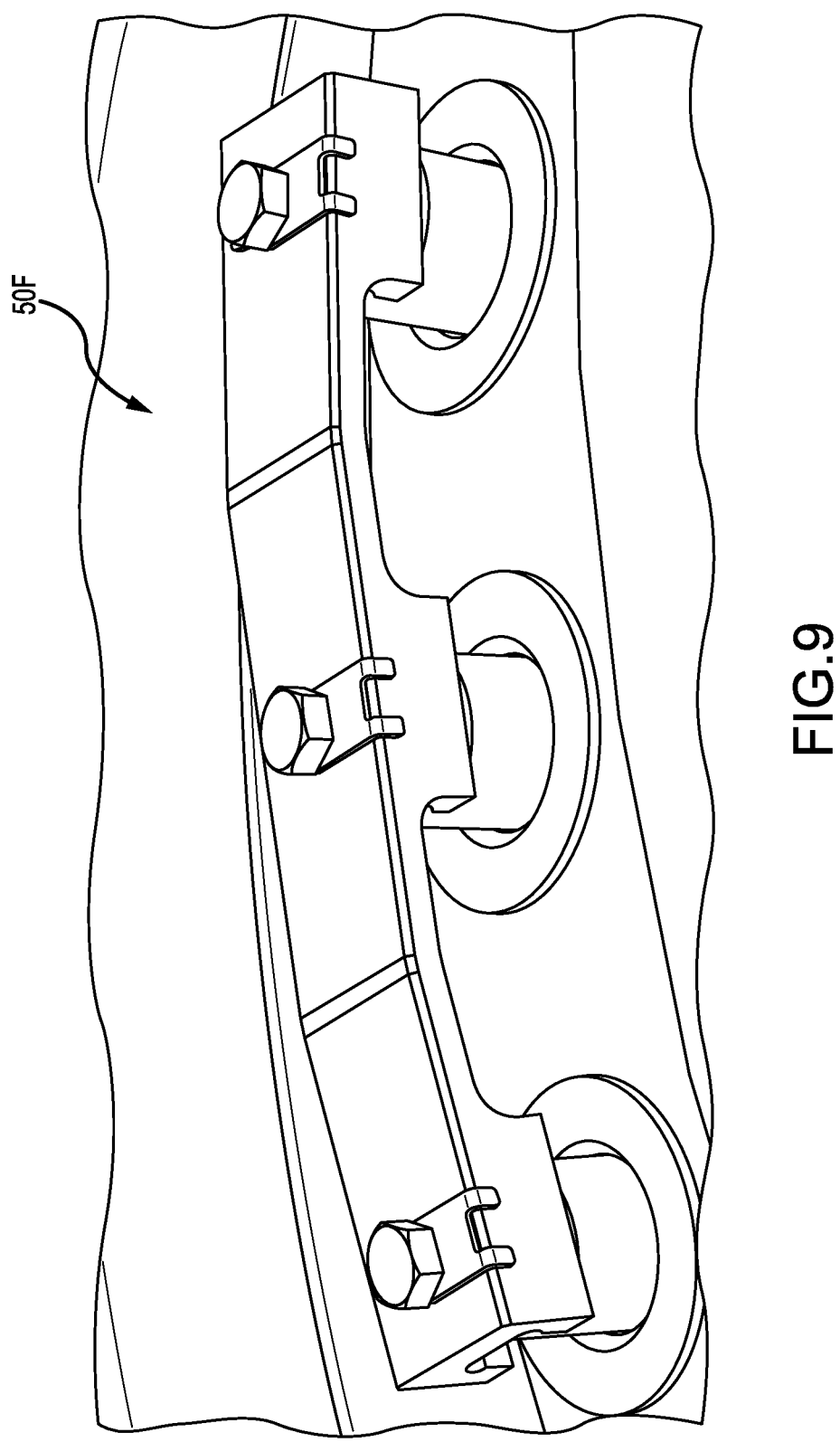
FIG. 9 illustrates a variable vane stabilizer configured to connect three variable vanes, in accordance with various embodiments.

With reference to FIG. 8, a circumferential vane trunnion variable vane stabilizer 50F is disclosed. A circumferential vane trunnion variable vane stabilizer 50F may be configured to exhibit various characteristics, for instance, such an arrangement further accommodates tolerance stack up during assembly and thermal growth. Flexibility may be sufficient for vibration damping, although stiffness may also be accommodated, as the circumferential orientation of the circumferential keyed channel(s) 309 accommodate circumferential movement and variations. Moreover, as depicted in FIG. 9, while various embodiments disclosed herein may be extended to accommodate more than two vanes for a single variable vane stabilizer, the circumferential vane trunnion variable vane stabilizer 50F is specifically illustrated in FIG. 9 accommodating three vanes, such as may be desired to accommodate odd numbers of vanes.

A circumferential vane trunnion variable vane stabilizer 50F may comprise a circumferential extension member 200F bounded at each distal end by a vane stem interface 300F. Thus, one may appreciate that the nearest neighbor attachments 100F, 400F may be omitted. Thus, one may appreciate that the nearest neighbor attachments 100F, 400F may be omitted and first and second vane stem interfaces 300F may bound the circumferential extension member 200F With reference to FIG. 8, a circumferential extension member 200F may comprise a planar flex member 203. A planar flex member 203 may permit limited flexing of the circumferential vane trunnion variable vane stabilizer 50F in one or more degree(s) of freedom, and may limit flexing of the circumferential vane trunnion variable vane stabilizer 50F in one or more other degree(s) of freedom. Thus, the circumferential extension member 200F and the two vane stem interfaces 300F may combine to permit limited movement in a circumferential direction, while limiting movement in other directions.

Each vane stem interface 300F may comprise a circumferential keyed channel 309. The circumferential keyed channel 309 may comprise a channel extending through a portion of the circumferential vane trunnion variable vane stabilizer 50F perpendicularly to a longer surface of the circumferential vane trunnion variable vane stabilizer 50F and parallel to a shorter surface of the circumferential vane trunnion variable vane stabilizer 50F (e.g., longitudinally aligned along a primary axis of the circumferential vane trunnion variable vane stabilizer 50F). The circumferentially keyed channel 309 may be perpendicular to the engine central longitudinal axis X-X'. A vane 51 may be received into the circumferential keyed channel 309 and affixed in position by a fastener, such as may be insertable through a fastener aperture of the vane stem interface 300F.

Figure 10:
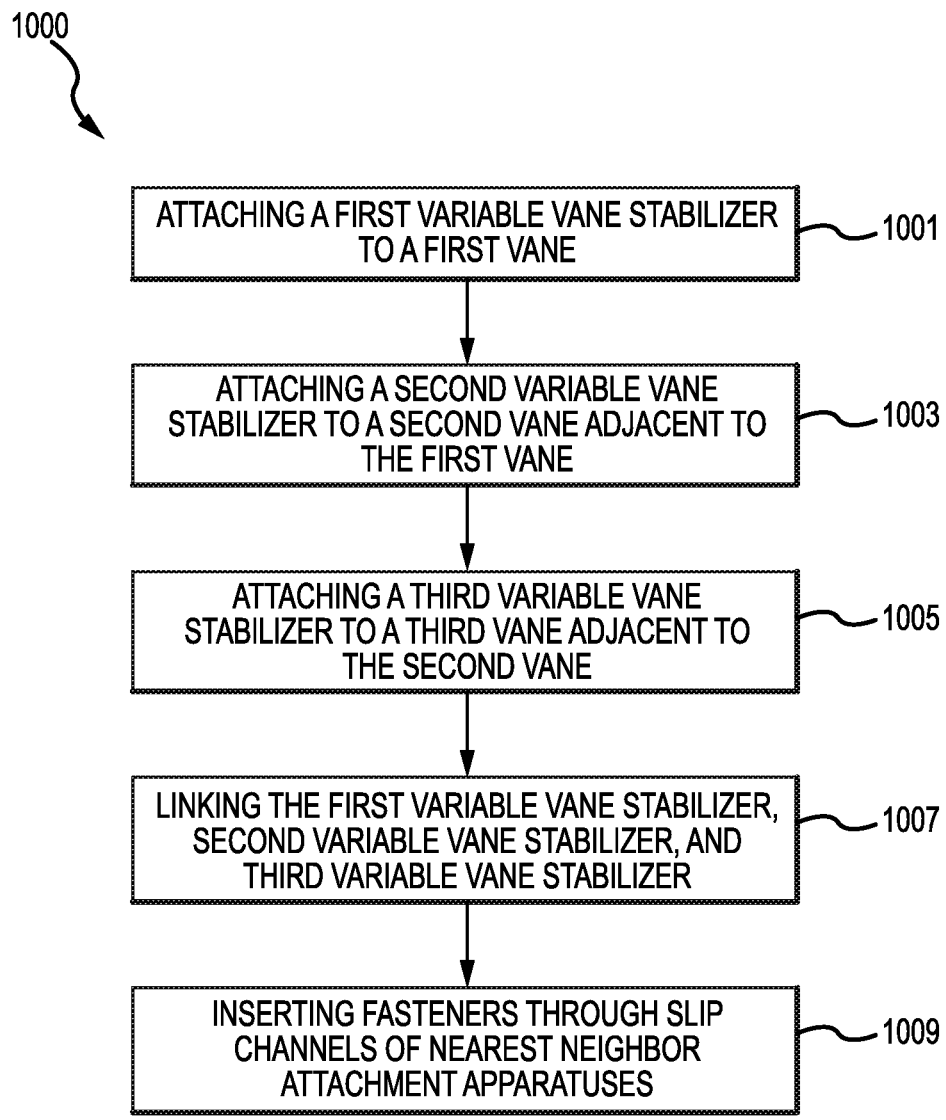
FIG. 10 illustrates a method of variable vane stabilizer installation, in accordance with various embodiments.

Having discussed different structural aspects of variable vane stabilizers, attention is directed to FIG. 10, which discloses a method of variable vane stabilizer installation 1000. The method may include attaching a first variable vane stabilizer to a first vane (step 1001), attaching a second variable vane stabilizer to a second vane adjacent to the first vane (step 1003), attaching a third variable vane stabilizer to a third vane adjacent to the second vane (step 1005), and linking the first variable vane stabilizer, second variable vane stabilizer, and third variable vane stabilizer (step 1007). The linking may include connecting a first nearest neighbor attachment of the first variable vane stabilizer to a second nearest neighbor attachment of the second variable vane stabilizer and connecting a first nearest neighbor attachment of the second variable vane stabilizer to a second nearest neighbor attachment of the third variable vane stabilizer. In various embodiments, the first vane has a first angle of attack, the second vane has a second angle of attack, and the third vane has a third angle of attack. By linking the variable vane stabilizers, these angles of attack may be fixed. In various embodiments, the first, second, and third angle of attack are the same. The assembly of nearest neighbor attachments may be secured in connection to each other and the assembly may be repeated to form a complete annulus of variable vane stabilizers. Finally, fasteners may be inserted through slip channels of the nearest neighbor attachments (step 1009), whereby the assembly of nearest neighbor attachments may be secured in connection to each other preloading the annular arrangement of adjacent variable vane stabilizers.

With reference to FIGS. 1-9, a variable vane stabilizer 50A, 50B, 50C, 50D, 50E, and 50F, may be made of various materials. For instance, a variable vane stabilizer 50A, 50B, 50C, 50D, 50E, and 50F may be made of a single material, or different materials, or combinations of materials. For example, components of the system are made from metal. For example, aspects of a variable vane stabilizer 50A, 50B, 50C, 50D, 50E, and 50F are metal, such as nickel, cobalt, molybdenum, titanium, aluminum, steel, or stainless steel, though it alternatively comprises numerous other materials configured to provide support. Components of the system are optionally made from other materials such as, for example, composite, ceramic, plastics, polymers, alloys, glass, binder, epoxy, polyester, acrylic, or any material or combination of materials having desired material properties, such as heat tolerance, strength, stiffness, or weight. Portions of a variable vane stabilizer 50A, 50B, 50C, 50D, 50E, and 50F as disclosed herein are optionally made of different materials or combinations of materials, and/or comprise coatings. Moreover, components of the variable vane stabilizer 50A, 50B, 50C, 50D, 50E, and 50F are in some instances mixtures of different materials according to different ratios, gradients, and the like.

A variable vane stabilizer 50A, 50B, 50C, 50D, 50E, and 50F thus has multiple materials, or any material configuration suitable to enhance or reinforce the resiliency and/or support of the system when subjected to wear in an aircraft or industrial operating environment or to satisfy other desired electromagnetic, chemical, physical, or material properties, for example coefficient of thermal expansion, ductility, weight, flexibility, strength, or heat tolerance.

One such material is an austenitic nickel-chromium-based alloy such as Inconel®, which is available from Special Metals Corporation of New Hartford, N.Y., USA. Other such material includes ceramic matrix composite (CMC). Further material includes refractory metal, for example, an alloy of titanium, such as, titanium-zirconium-molybdenum (TZM).

Various benefits and advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A variable vane stabilizer comprising:
   a first nearest neighbor attachment comprising a channel and configured to connect to a first adjacent variable vane stabilizer in accordance with the variable vane stabilizer;
   a second nearest neighbor attachment configured to connect to a second adjacent variable vane stabilizer in accordance with the variable vane stabilizer;
   a circumferential extension member disposed between the first nearest neighbor attachment and the second nearest neighbor attachment and spacing apart the first nearest neighbor attachment and the second nearest neighbor attachment, the second nearest neighbor attachment comprising a fastener channel extending through a distal end of the circumferential extension member and configured to receive a fastener; and
   a vane stem interface configured to attach the variable vane stabilizer to a vane with a fixed angle of attack, wherein:
   the first nearest neighbor attachment further comprises an abutment surface,
   the abutment surface includes a planar face disposed circumferentially outboard of the vane stem interface,
   the abutment surface is configured to contact a third nearest neighbor attachment of the second adjacent variable vane stabilizer,
   the third nearest neighbor attachment is in accordance with the second nearest neighbor attachment of the variable vane stabilizer, and
   the third nearest neighbor attachment and the channel are configured to receive the fastener therethrough and couple the second nearest neighbor attachment and the third nearest neighbor attachment to the vane.

2. The variable vane stabilizer according to claim 1, wherein the vane stem interface comprises:
   an axial keyed channel extending through a portion of the variable vane stabilizer and configured to receive a first portion of the vane;
   keying tangs comprising bosses extending inwardly toward a center of the axial keyed channel and configured to press against a second portion of the vane; and an expansion chamfer comprising a relief undercut between the keying tangs and a radially outermost face of the axial keyed channel.

3. The variable vane stabilizer according to claim 1, wherein the second nearest neighbor attachment further comprises a preload spacer radially outward of the fastener channel.

\* \* \* \* \*